United States Patent
Akiyama et al.

(10) Patent No.: US 10,746,927 B2
(45) Date of Patent: Aug. 18, 2020

(54) OPTICAL-FIBER-HOLDING MEMBER, AND FUSING DEVICE

(71) Applicants: FURUKAWA ELECTRIC CO., LTD., Tokyo (JP); SEIWA GIKEN INC., Tokyo (JP)

(72) Inventors: Tomohiro Akiyama, Tokyo (JP); Takashi Tanaka, Tokyo (JP)

(73) Assignees: FURUKAWA ELECTRIC CO., LTD., Tokyo (JP); SEIWA GIKEN INC., Tokyo (JP)

( * ) Notice: Subject to any disclaimer, the term of this patent is extended or adjusted under 35 U.S.C. 154(b) by 120 days.

(21) Appl. No.: 15/826,301

(22) Filed: Nov. 29, 2017

(65) Prior Publication Data

US 2018/0081120 A1  Mar. 22, 2018

Related U.S. Application Data

(63) Continuation of application No. PCT/JP2017/004673, filed on Feb. 9, 2017.

(30) Foreign Application Priority Data

Feb. 12, 2016 (JP) ................... 2016-024897

(51) Int. Cl.
*G02B 6/255* (2006.01)
*G02B 6/36* (2006.01)

(52) U.S. Cl.
CPC ......... *G02B 6/2555* (2013.01); *G02B 6/2551* (2013.01); *G02B 6/3616* (2013.01)

(58) Field of Classification Search
CPC ... G02B 6/2555; G02B 6/2551; G02B 6/3616
See application file for complete search history.

(56) References Cited

U.S. PATENT DOCUMENTS 4,252,407 A    2/1981 Bubanko et al.
2007/0036508 A1*  2/2007 Sato ..................... G02B 6/2551
                                          385/137

(Continued)

FOREIGN PATENT DOCUMENTS

CN    202870339 U    4/2013
JP    S54-83450 A    7/1979

(Continued)

OTHER PUBLICATIONS

English translation of JP 2001-208931, Mori et al., Fusion splicing method, fusion splicing machine and coat removing device for optical fiber, Aug. 3, 2001. (Year: 2001).*

(Continued)

*Primary Examiner* — Queenie S Dehghan
(74) *Attorney, Agent, or Firm* — Marshall, Gerstein & Borun LLP (57) ABSTRACT

The main body part is a substantially cuboid member in which an optical fiber is disposed. One width-direction side of the main body part is provided with a lid part capable of opening and closing with respect to the main body part on a hinge. An installation part on which an optical fiber or the like is disposed is formed on the upper surface (the surface facing the lid part) of the main body part. The installation part comprises a reference surface and a recessed portion that is formed closer to the distal-end side than is the reference surface and that is formed at a lower position than is the reference surface. The reference surface is a region where the optical fiber or the like is pressed down by a pressing part. The recessed portion is a region where a drop cable is pressed in by a pressing part.

5 Claims, 12 Drawing Sheets

(56) References Cited

U.S. PATENT DOCUMENTS

| | | | | |
|---|---|---|---|---|
| 2007/0053648 A1* | 3/2007 | Sasaki | ................. | G02B 6/3616 |
| | | | | 385/137 |
| 2009/0046982 A1 | 2/2009 | Wiley et al. | | |
| 2013/0202257 A1* | 8/2013 | Choi | ................... | G02B 6/2555 |
| | | | | 385/98 |
| 2017/0168240 A1* | 6/2017 | Bottcher | ................. | G02B 6/25 |

FOREIGN PATENT DOCUMENTS

| JP | H7-230017 A | 8/1995 |
|---|---|---|
| JP | H7-306330 A | 11/1995 |
| JP | H11-202155 A | 7/1999 |
| JP | 2000-241664 A | 9/2000 |
| JP | 2001-208931 A | 8/2001 |
| JP | 2003-98377 A | 4/2003 |
| JP | 2007-171824 A | 7/2007 |

OTHER PUBLICATIONS

International Search Report issued in PCT Patent Application No. PCT/JP2017/004673 dated May 9, 2017.
Office Action issued in Chinese Patent Application No. 20178001681.5 dated Apr. 28, 2019.

\* cited by examiner

OPTICAL-FIBER-HOLDING MEMBER, AND FUSING DEVICE

TECHNICAL FIELD

This disclosure relates to an optical-fiber-holding member that is capable of holding optical fiber cables or optical fiber core cables having different outer diameters, and the like.

BACKGROUND

When optical fibers are to be spliced or the like, an optical-fiber-holding member for holding the optical fiber is used. For example, an optical fiber is held by an optical-fiber-holding member and is cut and removed of its coating. Then each optical-fiber-holding member is set into a fusing device to splice the optical fibers by fusion (Japanese Unexamined Patent Application Publication No. 2003-98377 (JP-A-2003-98377), for example).

When splicing optical fiber core cables having an outer diameter of 0.25 mm together, for example, a method in which optical-fiber-holding members hold the optical fibers, coatings of a predetermined range of the optical fibers are then removed, and the optical fibers of connection targets are butted together to be fusion spliced has been adopted.

However, the 0.25 mm optical fiber core cable has a small outer diameter and is difficult to handle, so there are cases in which optical fibers with larger diameters are used. If the same optical-fiber-holding members are used in such a case where optical fibers with different outer diameters are to be handled, the core positions of the optical fibers differ and it may be difficult to ensure alignment of the cores when fusion splicing.

Furthermore, there are cases in which drop cables are used when laying optical fibers from outdoors into indoor rooms. Since such a drop cable is an optical fiber coated by an outer jacket and thus has a large outer diameter, it is difficult for an optical-fiber-holding member for optical fiber core cables to hold the drop cable. Thus, it has been necessary to use an optical-fiber-holding member specialized for holding drop cables.

However, using different optical-fiber-holding members for various types of optical fibers demands the operator to carry a plurality of types of optical-fiber-holding members, and its workability is inefficient.

On the other hand, there is a method in which the length of the outer jacket or the like that is to be removed is increased and the optical-fiber-holding member holds the optical fiber at the part where the outer jacket or the like is removed. In this way, even for the drop cables, the optical fiber inside can be securely held and splicing operations and the like can be carried out.

However, in this method, the length of the part where the outer jacket or the like is removed is longer and thus the part that requires reinforcement after splicing becomes longer. Thus, it is preferable that the length of the part where the outer jacket or the like is removed is as short as possible. So, it is desirable that one optical-fiber-holding member can hold optical fiber core cables or optical fiber cables with different outer diameters without removing the outer jacket or the like more than necessary.

SUMMARY OF THE DISCLOSURE

The presently disclosed embodiments were made in view of such problems. The object is to provide an optical-fiber-holding member that is capable of holding optical fiber core cables or optical fiber cables with different outer diameters, and the like.

To achieve the above object, a first embodiment is an optical-fiber-holding member including a main body part on which an optical fiber is disposed and a lid part that can be opened and closed with respect to the main body part. The main body part includes, on an optical fiber installation part, a reference surface and a recessed portion formed. The reference surface holds the optical fiber, and the recessed portion, of which a bottom surface is at a lower position than that of the reference surface, is formed in proximity of a front end of the main body. On an inner surface of the lid part, a first pressing part, of which an amount of protrusion from the inner surface of the lid part is variable, is provided at a position facing the reference surface, and a second pressing part is provided at a position facing the recessed portion.

Preferably, for the second pressing part, the amount of protrusion from the inner surface of the lid part on a side of the front end of the main body is larger than the amount of protrusion from the inner surface of the lid part on a side of the first pressing part.

With the lid part being closed, it is preferable that a distance in a height direction between a level of the reference surface and a lower end of the second pressing part is smaller than the maximum distance between the level of the reference surface and a lower end of the first pressing part and is larger than the minimum distance between the level of the reference surface and a lower end of the first pressing part.

Preferably, a holding part that holds the optical fiber is formed at the front end of the main body part and the holding part is approximately an U-shaped groove when viewed in an axial direction of the optical fiber.

The groove may have a width of 0.9 mm or more.

A second embodiment is a fusing device including the optical-fiber-holding member according to the first embodiment and a pair of electrode rods that are provided between a pair of the optical-fiber-holding members. An arc is generated between the pair of the electrode rods so that the optical fibers held by the optical-fiber-holding members can be fused together.

The presently described embodiments can provide an optical-fiber-holding member that is capable of holding both an optical fiber and a drop cable, and the like.

BRIEF DESCRIPTION OF DRAWINGS

FIG. 3 is a plan view showing the optical-fiber-holding member 1 holding an optical fiber core cable 17a.

FIG. 4A is a cross sectional view taken along B-B line in FIG. 3 showing the optical-fiber-holding member 1 holding the optical fiber core cable 17a.

FIG. 5A is a front view of the optical-fiber-holding member 1 holding the optical fiber core cable 17a.

DETAILED DESCRIPTION

Figure 1:
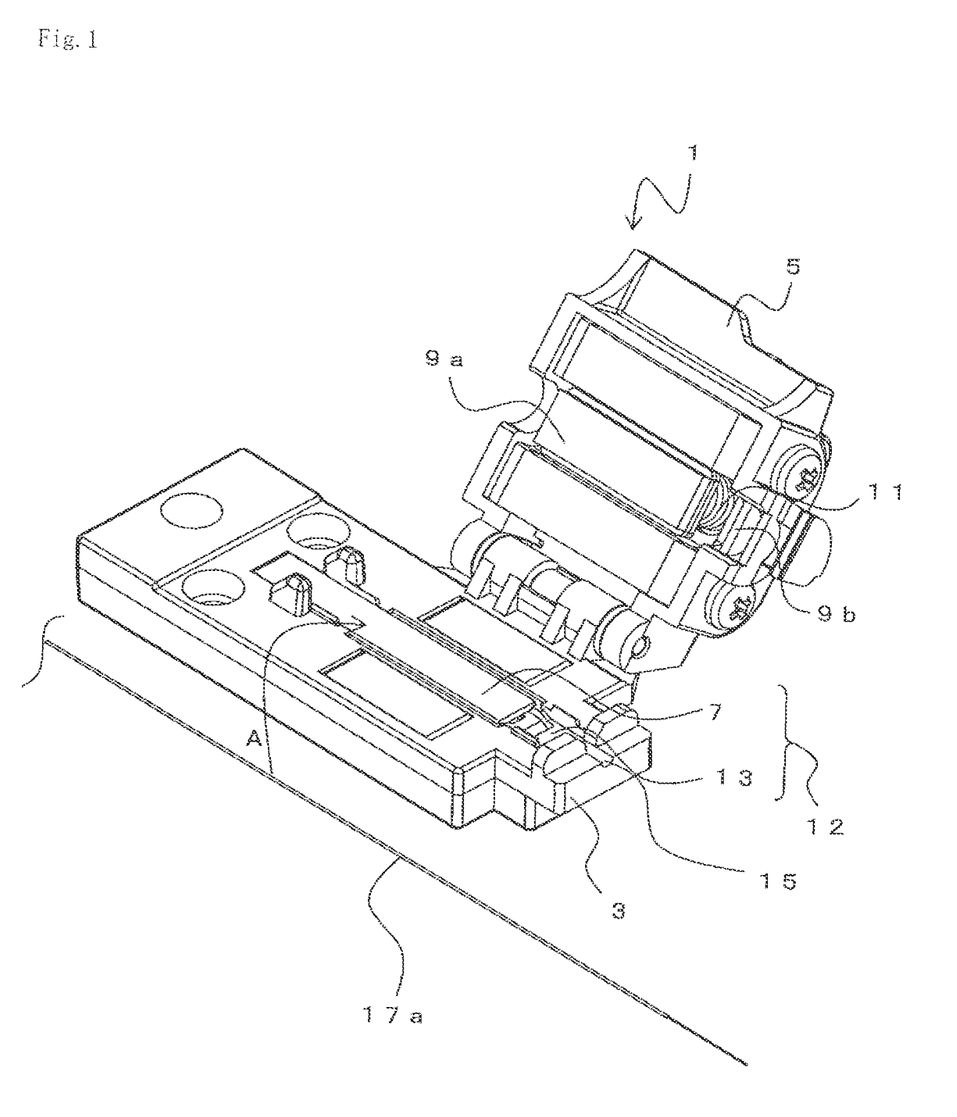
FIG. 1 is a perspective view showing an optical-fiber-holding member 1 with a lid part 5 being opened.
Figure 2:
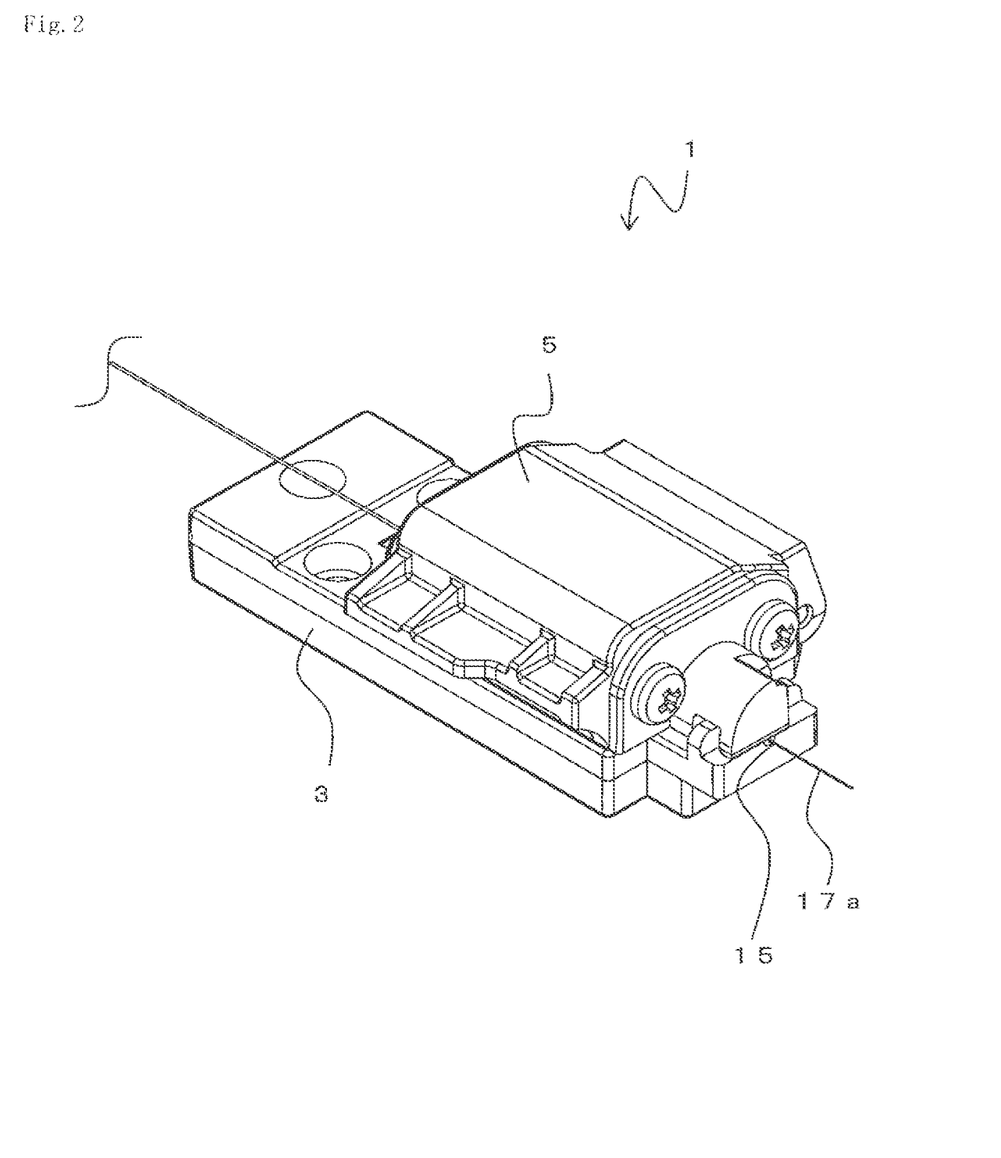
FIG. 2 is a perspective view showing the optical-fiber-holding member 1 with the lid part 5 being closed.
Figure 3:
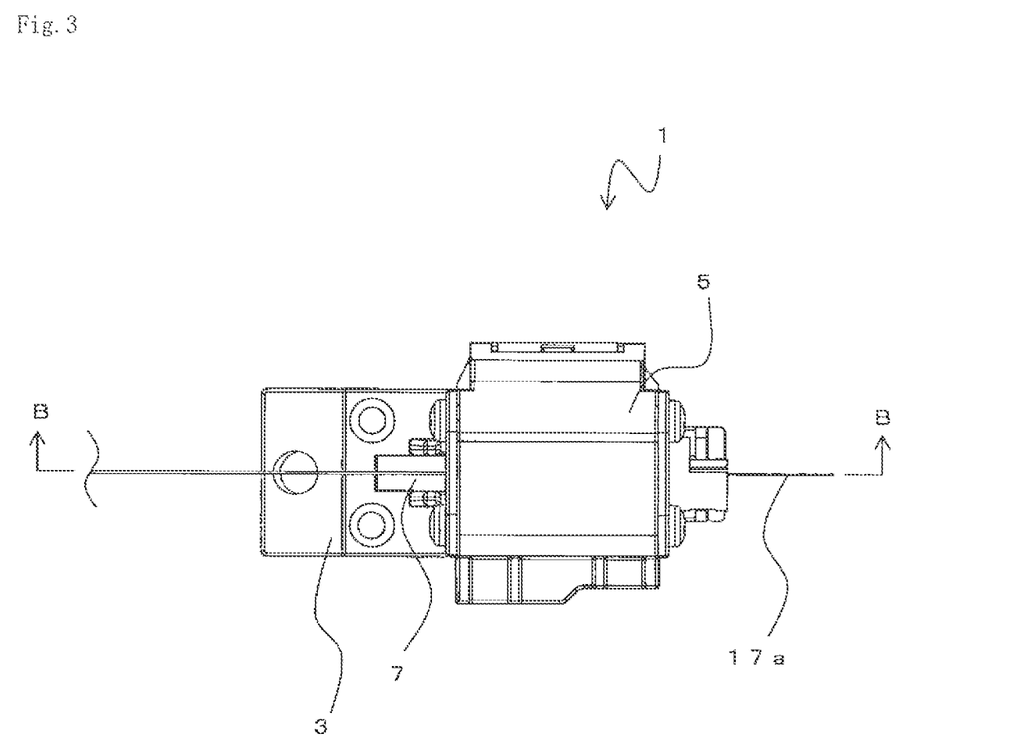

Hereinafter, an optical-fiber-holding member 1 according to an embodiment will be described. FIG. 1 is a perspective view showing the optical-fiber-holding member 1 with the lid part 5 being opened, and FIG. 2 is a perspective view showing the optical-fiber-holding member 1 with the lid part 5 being closed. Also, FIG. 3 is a plan view of FIG. 2. The optical-fiber-holding member 1 mainly includes a main body part 3, the lid part 5, pressing parts 9a and 9b, and so forth.

The main body part 3 is a part on which an optical fiber is disposed and is substantially a rectangular parallelepiped member. One side of a width direction of the main body part 3 is provided with a lid part 5 which can be opened or closed to the main body part 3 by a means of a hinge.

The main body part 3 and the lid part 5 are made of metal, for example. A magnet is disposed on a surface of the main body part 3 facing the lid part 5 so that, when the lid part 5 is closed, the magnet can keep the lid part 5 being closed to the main body part 3.

An installation part 12 on which an optical fiber or the like is to be disposed is formed on an upper surface of the main body part 3 (a surface facing the lid part 5). The installation part 12 includes a reference surface 7 and a recessed portion 13. The recessed portion 13 is formed in the proximity of a front end of the main body part 3, which is further on a front end side of the main body part 3 than the reference surface 7. Also, a bottom surface of the recessed portion 13 is formed at a position lower than the reference surface 7 (in a direction moving away from the lid part 5). The reference surface 7 is a part where an optical fiber or the like is pressed by the pressing part 9a, which will be described below. The recessed portion 13 is a part into which an optical fiber cable having a larger outer diameter than an optical fiber core cable, such as a drop cable, is pushed by the pressing member 9b, which will be described below.

Here, the drop cable has a following structure, for example. An optical fiber core cable is disposed at the approximate center of the drop cable and a pair of tension members are provided on both sides of the optical fiber core cable with a space between the optical fiber core cable and the tension member. An approximately rectangular outer jacket unifies the optical fiber core cable and the tension members together. Notches are formed on an upper and a lower surface of the outer jacket of the optical fiber core cable at positions facing each other (on outer peripheral surfaces in a direction perpendicular to the direction in which the tension members are provided in parallel). By ripping the outer jacket from the upper and lower notches using tools, such as a cable splitter or a nipper, the optical fiber core cable therein can be separated and taken out from the tension members and the outer jacket. The size of the drop cable (the outer jacket) may be, for example, approximately 2.0 mm*3.1 mm.

A holding part 15 is provided at the front end side of the main body part 3. The holding part 15 is a part that positions the optical fiber protruding from the optical-fiber-holding member 1. The holding part 15 will be described in detail below.

The pressing member 9a, which is a first pressing member, is formed on an inner surface of the lid part 5 over a longitudinal direction thereof at a part facing the reference surface 7. The pressing part 9a protrudes from the inner surface of the lid part 5 for a predetermined amount. The pressing part 9a is a member that presses and holds the optical fiber or the like disposed on the main body part 3. The pressing part 9a is made of a material that does not damage the optical fiber, such as cork.

An elastic member such as a spring 11 supports the pressing member 9a to the lid part 5. Thus, the amount of protrusion of the pressing member 9a from the inner surface of the lid part 5 varies. That is, when the lid part 5 is closed, the gap between the pressing part 9a and the reference surface 7 can be varied within a range of elastic deformation of the spring 11 as well as the spring 11 can press the optical fiber or the like toward the reference surface 7.

The pressing part 9b, which is a second pressing part, is formed on the inner surface of the lid part 5 at a part facing the recessed portion 13. The pressing part 9b protrudes from the inner surface of the lid part 5 for a predetermined amount. The pressing part 9b is a member that presses and holds the drop cable disposed on the main body part 3. The pressing part 9b will be described in detail below.

Next, a method for holding an optical fiber core cable 17a using the optical-fiber-holding member 1 will be described. Here, the optical fiber core cable 17a has a diameter of 0.25 mm, for example, and includes a glass optical fiber of which the periphery is coated with a coating layer made of UV curable resin, for example. Also, at a tip of the optical fiber core cable, the coating is removed and the glass optical fiber of 0.125 mm diameter is exposed. Alternatively, an optical fiber core cable being coated to the tip may be held, and, in such a case, the coating is removed at the tip of the optical fiber core cable after the optical fiber core cable 17a is held by the optical-fiber-holding member 1.

First, the optical fiber core cable 17a is disposed on the reference surface 7 (an arrow A in FIG. 1). Next, the lid part 5 is closed so that the front end side of the optical fiber core cable 17a protrudes from the holding part 15 as shown in FIG. 2. Also, the holding part 15 determines the position of the optical fiber core cable 17a.

Figure 4A:
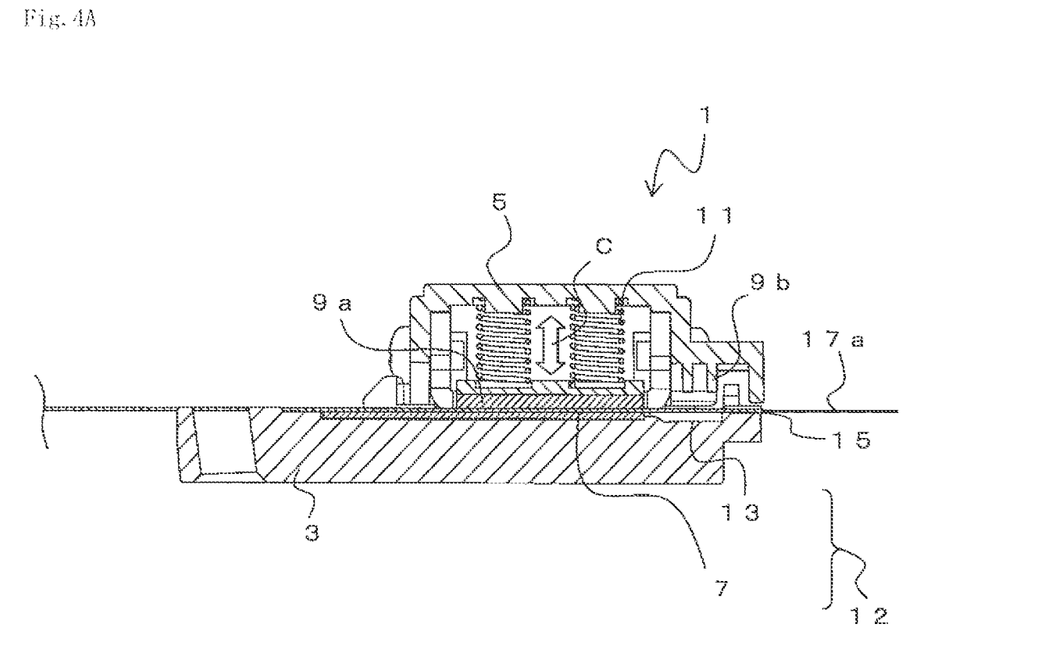

FIG. 4A is a cross sectional view taken along B-B line in FIG. 3. When the lid part 5 is closed, the pressing member 9a presses the optical fiber core cable 17a toward the reference surface 7. Also, the optical fiber core cable 17a lies substantially straight from the reference surface 7 and the front end thereof protrudes from the front end of the optical-fiber-holding member 1 through the holding member 15. At this time, the optical fiber core cable 17a is not in contact with the recessed portion 13 or the pressing part 9b.

As mentioned above, the pressing part 9a is supported by the spring 11. Thus, the amount of protrusion of the pressing part 9a from the lid part 5 can change with expansion and contraction of the spring 11 (an arrow C in the drawing).

Here, when the lid part 5 is opened (when the pressing part 9a is not in a pressing state), the pressing part 9a protrudes from the inner surface of the lid part 5 for a predetermined amount or more. Thus, when the lid part 5 is closed without disposing the optical fiber core cable 17a, the pressing part 9a comes into contact with the reference surface 7 and is pushed back toward the inner surface of the lid part 5 for the predetermined amount.

On the other hand, when the lid part 5 is closed with the optical fiber core cable 17a being disposed, the pressing part 9a is further pushed back toward the inner surface of the lid part 5 by a height of the optical fiber core cable 17a than when in contact with the reference surface 7, and thereby pressing the optical fiber core cable 17a with a predetermined force. As a result, the optical fiber core cable 17a is pressed to the reference surface 7 and is held against the force in the axial direction.

Figure 4B:
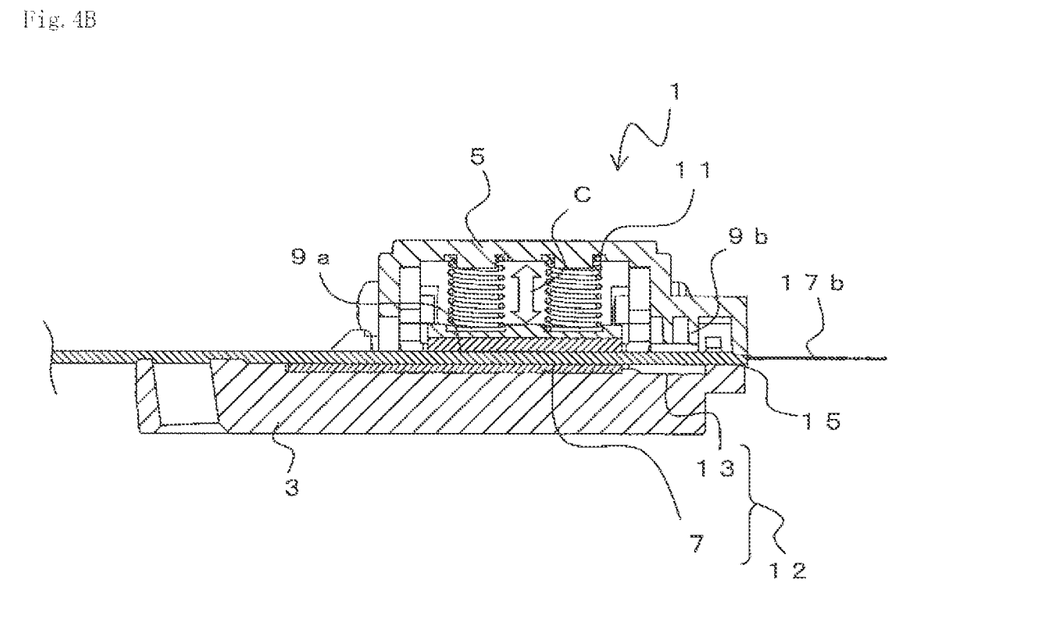
FIG. 4B is a cross sectional view of the optical-fiber-holding member 1 holding an optical fiber core cable 17b.

Similarly, FIG. 4B is a cross sectional view showing a state in which an optical fiber core cable 17b is held. The optical fiber core cable 17b is an optical fiber having a larger diameter than the optical fiber core cable 17a and is an optical fiber core cable of 0.9 mm diameter, for example. Also in this case, the pressing part 9a can press the optical fiber core cable 17b with a predetermined force.

Here, the optical fiber core cable of 0.9 mm diameter includes a glass optical fiber of 0.125 mm diameter of which the periphery is coated with an outer jacket of 0.9 mm diameter, for example.

When the lid part 5 is closed with the optical fiber core cable 17b being disposed, the pressing part 9a is pushed back toward the inner surface of the lid part 5 by slightly more (0.9−0.25=0.65 mm) than when holding the optical fiber core cable 17a. Thus, the pressing part 9a can press the optical fiber core cable 17b with a pressing force corresponding to the pushed back amount.

Figure 5A:
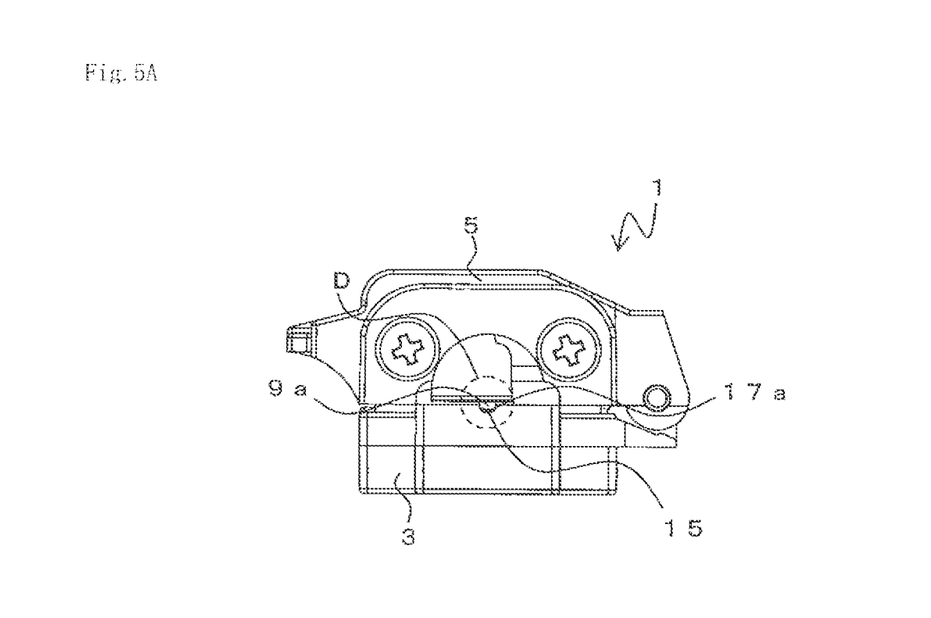
Figure 5B:
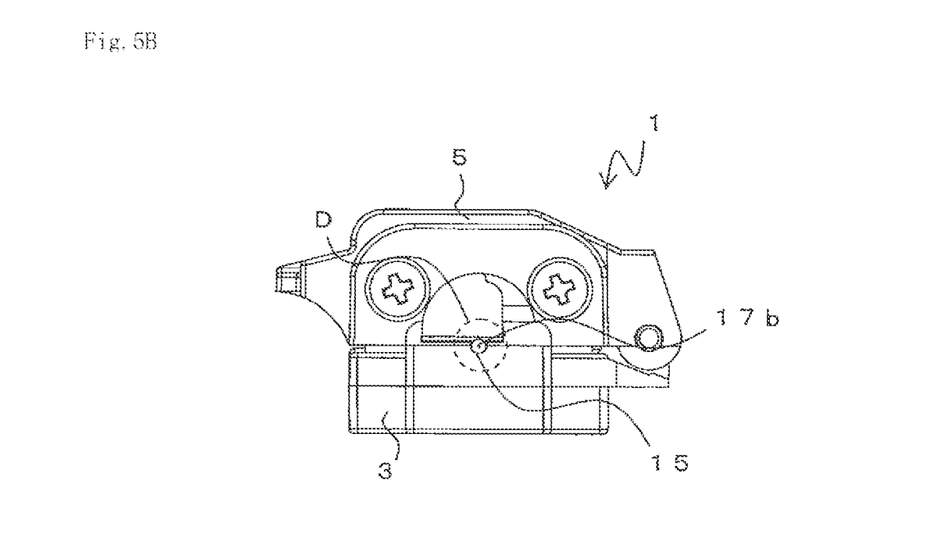
FIG. 5B is a front view of the optical-fiber-holding member 1 holding the optical fiber core cable 17b.

FIG. 5A is a front view of FIG. 4A and FIG. 5B is a front view of FIG. 4B. That is, FIG. 4A is a front view of a state in which the optical fiber core cable 17a is held, and FIG. 4B is a front view of a state in which the optical fiber core cable 17b is held. Also, FIG. 6A is an enlarged view of D section in FIG. 5A and FIG. 5B, in which the optical fiber core cable 17a and 17b are drawn on top of another.

Figure 6A:
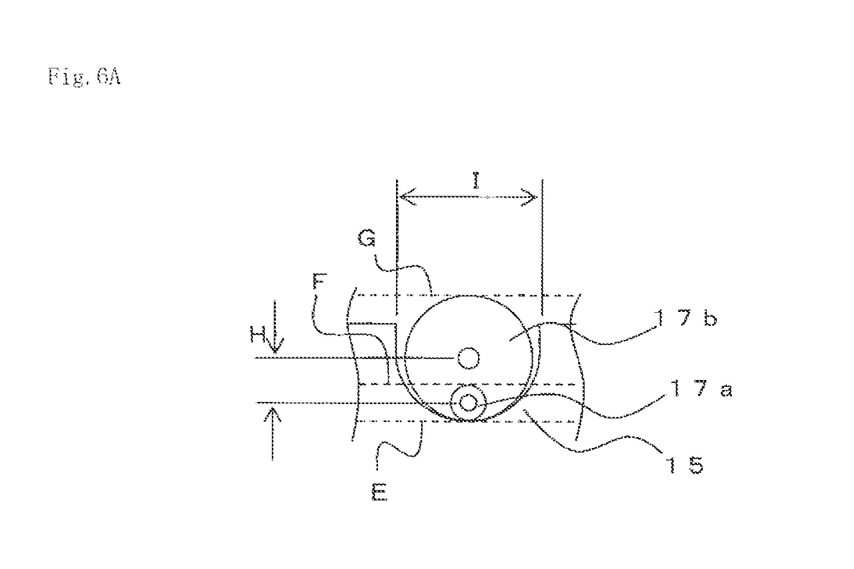
FIG. 6A is an enlarged view of a holding part 15 at D section in FIG. 5A and FIG. 5B.

As shown in FIG. 6A, the holding part 15 for holding the optical fiber core cable 17a or 17b is formed at the front end of the main body part 3. The holding part 15 is a groove in an approximately U shape when viewed in an axial direction of the optical fiber core cable 17a or 17b. The holding part 15 has a groove width (I in the drawing) in such a manner that the optical fiber core cable 17b can be inserted therein. For example, to hold the optical fiber core cable 17b of 0.9 mm diameter, the groove width of the holding part 15 should be 0.9 mm or more.

The holding part 15 is a U-shaped groove so that the lower end of the optical fiber core cable 17a or 17b contacts the lowest part of the U-shaped groove. Thus, a core center height difference H between the optical fiber core cables 17a and 17b can be smaller compared to a case of a V-shaped groove shown in FIG. 6B.

Figure 6B:
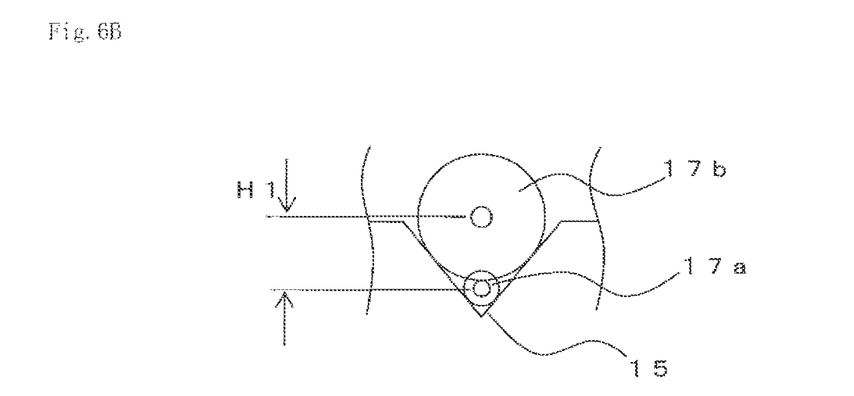
FIG. 6B is a drawing showing another embodiment of the holding part 15.

On the other hand, as shown in FIG. 6B, if the holding part 15 is a V-groove, the positions of the lower ends of the optical fiber core cables 17a and 17b do not coincide and the core center height difference H1 becomes larger. If the holding part 15 is a complete slit rather than a groove, then it is possible to make the core positions coincide with each other. However, in this case, the lower end of the optical fiber core cable 17a or 17b is not supported so the reproducibility of the core positions becomes lower.

Here, a dotted line E in FIG. 6A shows the level of the reference surface 7. Also, a dotted line F shows the position of the lower end of the pressing part 9a when holding the optical fiber core cable 17a. Also, a dotted line G shows the position of the lower end of the pressing part 9a when holding the optical fiber core cable 17b. As mentioned above, the height of the pressing part 9a varies with the outer diameters of the optical fiber core cables 17a and 17b, which are the objects to be held.

Figure 7:
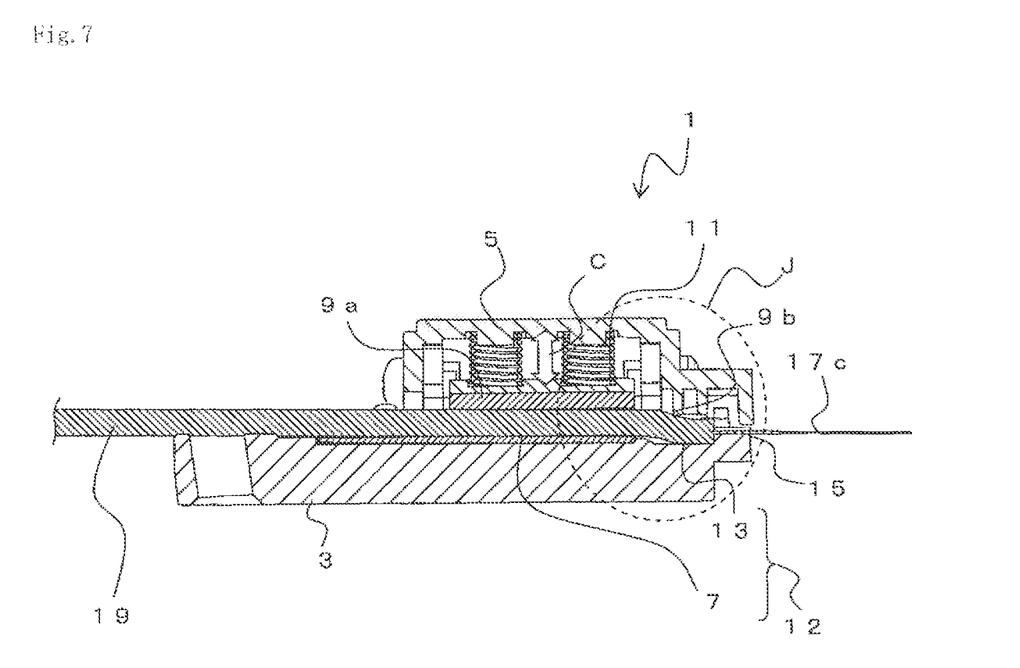
FIG. 7 is a cross sectional view of the optical-fiber-holding member 1 holding a drop cable 19.
Figure 8:
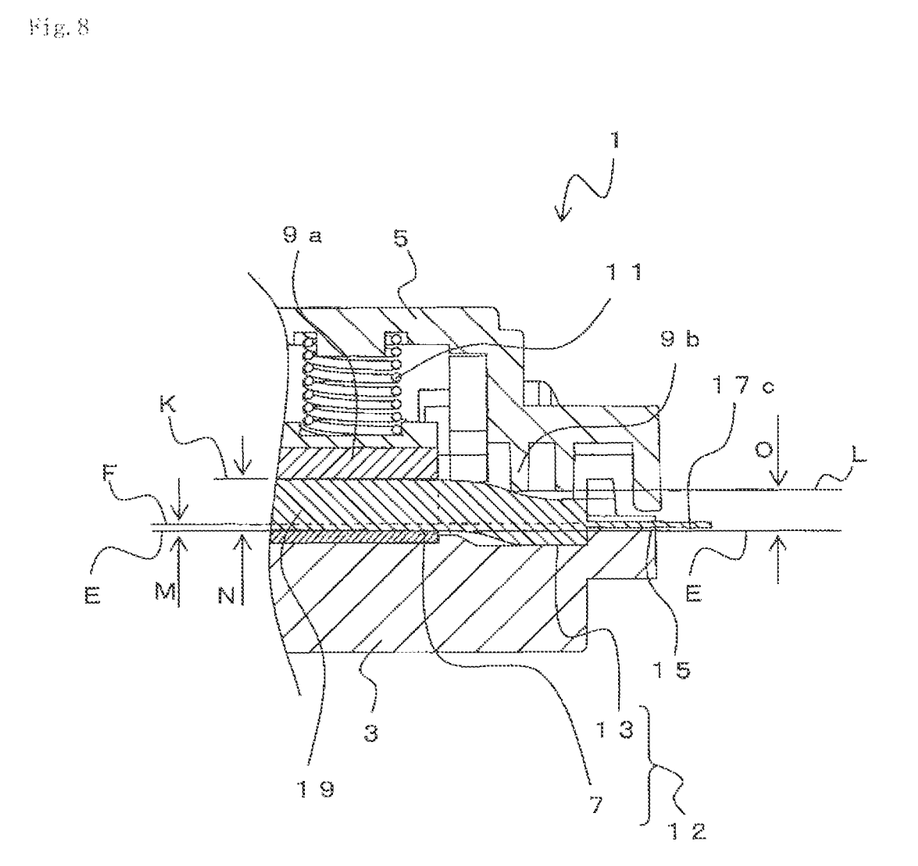
FIG. 8 is an enlarged view of J section in FIG. 7.

Next, a method for holding a drop cable using the optical-fiber-holding member 1 will be described. FIG. 7 is a cross sectional view of the optical-fiber-holding member 1 holding a drop cable 19 and FIG. 8 is an enlarged view of J section in FIG. 7. As mentioned above, when holding the drop cable 19, the height of the pressing part 9a changes further compared to when holding the optical fiber core cable 17a or 17b.

Here, with the lid part 5 being closed, a distance between E and F (see FIG. 6 and FIG. 8) (distance M in FIG. 8) at the time of holding the optical fiber core cable 17a (0.25 mm diameter, for example), which has the minimum diameter among the objects to be held, is the minimum distance in the height direction between the level of the reference surface 7 (E in FIG. 6 and FIG. 8) and the lower end of the pressing part 9a.

Also, with the lid part 5 being closed, a distance between E and K (see FIG. 8) (distance N in FIG. 8) at the time of holding the drop cable 19 (2 mm high, for example) is the maximum distance in the height direction between the level of the reference surface 7 (E in FIG. 6 and FIG. 8) and the lower end of the pressing part 9a.

The pressing part 9b is fixed to the lid part 5. Thus, the amount of protrusion of the pressing part 9b from the lid part 5 does not change like the pressing part 9a. Also, the pressing part 9b is made of rigid resin or metal, for example, and has sufficient rigidity.

Here, with the lid part 5 being closed, a distance (O in FIG. 8) in the height direction between the level of the reference surface 7 and the lower end of the pressing part 9b (L in FIG. 8) is less than the maximum distance (N in FIG. 8) in the height direction between the level of the reference surface 7 and the pressing part 9a and more than the minimum distance (M in FIG. 8) in the height direction between the level of the reference surface 7 and the lower end of the pressing part 9a.

Thus, when the lid part 5 is closed and the drop cable 19 is held, the pressing part 9b presses a front end part of the drop cable 19 (the outer jacket thereof). At this time, the recessed portion 13 is formed on the main body part 3 facing the pressing part 9b. Thus, the proximity of the front end part of the drop cable 19 bends and is pushed into the recessed portion 13 that is at a position lower than the reference surface 7.

In this way, the center position of the drop cable 19 can be disposed in the proximity of the level of the reference surface 7. Thus, the optical fiber inside the drop cable 19 can be disposed in the proximity of the level of the reference surface 7. The optical fiber core cable 17c taken out from the drop cable 19 is positioned by the holding part 15.

As above, according to the present embodiment, the recessed portion 13 is formed on the main body part 3 and the pressing part 9b is formed on the lid part 5 at a part facing the recessed portion 13. Also, with the lid part 5 being closed, the distance in the height direction between the level of the reference surface 7 and the lower end of the pressing part 9b is less than the maximum distance in the height direction between the level of the reference surface 7 and the lower end of the pressing part 9a. Also, the reference surface 7, which holds the optical fiber, and the recessed portion 13, which is formed at a position lower than the reference surface 7, are formed. Thus, when the drop cable 19 is used, the drop cable 19 can be pushed into the recessed portion 13. Thus, the drop cable 19 is pushed into the recessed portion 13 to be bent so that the center position of the optical fiber inside the drop cable 19 can be closer to the center positions of the ordinary optical fiber core cables 17a and 17b when holding the optical fiber core cables 17a and 17b. Thus, the one optical-fiber-holding member 1 can hold the optical fiber core cables 17a and 17b and the drop cable 19.

Also, at this time, there is no need to remove the outer jacket of the drop cable 19 up to the position of the recessed portion 13. That is, removal of the outer jacket or the like of the drop cable 19 is unnecessary for the part held by the optical-fiber holding member 1. This can minimize the length of the outer jacket to be removed. Thus, when fusion splice is carried out, the length of the removed part of the outer jacket or the like can be decreased.

Also, with the lid part 5 being closed, the distance in the height direction between the level of the reference surface 7 and the lower end of the pressing part 9b is more than the minimum distance in the height direction between the level of the reference surface 7 and the lower end of the pressing part 9a. Thus, when the optical fiber core cable 17a or 17b is held, the optical fiber core cable 17a or 17b is not in contact with the pressing part 9b. Thus, a vertical position of the optical fiber core cable 17a or 17b can be determined by the holding part 15 and the reference surface 7.

That is, with the lid part 5 being closed, making the distance in the height direction between the reference surface 7 and the pressing part 9b less than the maximum distance between the reference surface 7 and the pressing part 9a allows the drop cable 19 to be pressed into the recessed portion 13 with certainty. Also, making the distance in the height direction between the reference surface 7 and the pressing part 9b more than the minimum distance in the height direction between the reference surface 7 and the pressing part 9a can prevent the optical fiber from being pressed by the pressing part 9b when the optical fibers are held.

Also, the shape of the holding part 15 at the front end of the main body part 3 is in an approximately U-shaped groove when viewed in the axial direction of the optical fiber. This makes it possible, for a plurality of types of the optical fiber core cables 17a and 17b having different outer diameters, to minimize the difference of the center positions (core height positions) of optical fiber strands of which the outer jacket parts are removed. A slight difference in the core height has small influence on splicing operations since a V-shaped groove formed on a fusion device side restricts the position of the optical fiber.

Also, by making the width of the U-shaped groove 0.9 mm or more, optical fibers having 0.25 mm diameter to 0.9 mm diameter that are commonly used can be adapted, for example.

When holding the drop cable 19, an amount of displacement of the pressing part 9a (an amount of displacement of the spring 11) to the lid part 5 is large and thus the pressing force becomes stronger. However, the drop cable 19 has a thick outer jacket so there is no influence on the optical fiber inside thereof.

Figure 9:
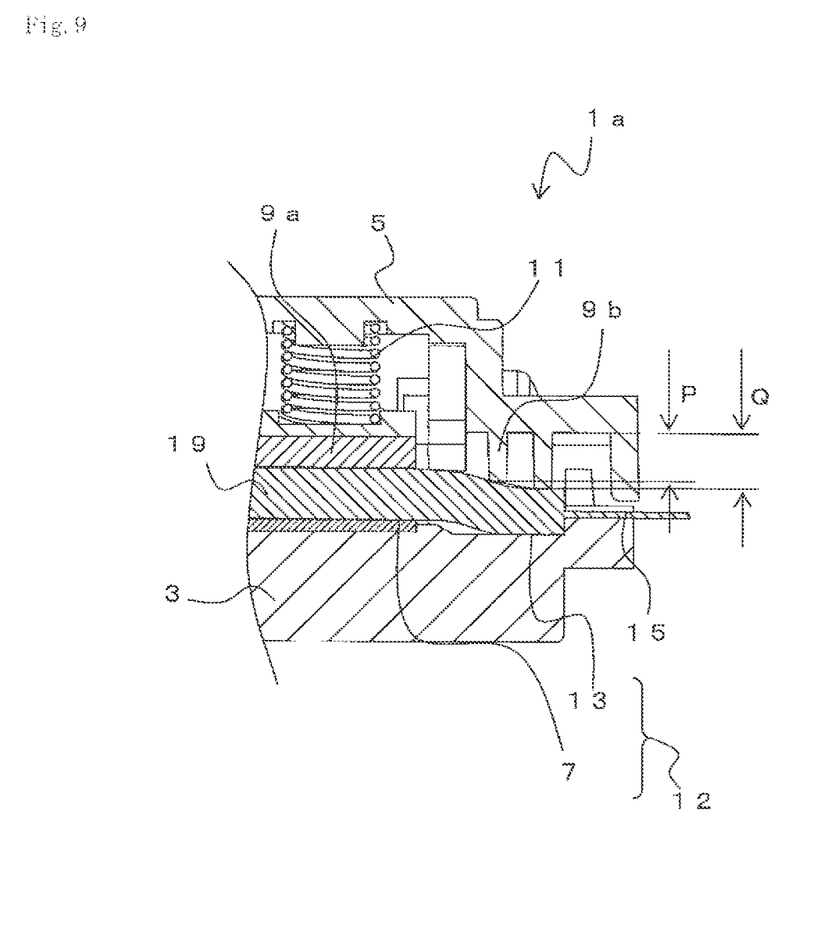
FIG. 9 is a drawing showing another embodiment of FIG. 8.

Next, a second embodiment will be described. FIG. 9 is a partially enlarged cross sectional view showing an optical-fiber-holding member 1a according to the second embodiment, and corresponding to FIG. 8. In the descriptions below, same notations as in FIG. 1 to FIG. 8 will be used for the structures with the same functions as in the optical-fiber-holding member 1 and redundant descriptions will be omitted.

The optical-fiber-holding member 1a has an approximately similar structure as the optical-fiber-holding member 1 except for the form of the pressing part 9b. The pressing part 9b is formed of a plurality of protruding portions. For example, in the example shown in the drawing, the pressing part 9b is formed of two protruding portions protruding from the inner surface side of the lid part 5.

In the pressing part 9b of the present embodiment, an amount of protrusion (Q in the drawing) from the inner surface of the lid part 5 of the protruding portion on the front end side of the main body part 3 (the right side in the drawing) is larger than an amount of protrusion (P in the drawing) from the inner surface of the lid part 5 of the protruding portion on a side of the pressing part 9a (the left side in the drawing). That is, heights of the plurality of protruding portions from the lid part 5 differ.

As mentioned above, when the drop cable 19 is held, the pressing part 9b presses the drop cable 19 toward the recessed portion 13. At this time, the pressing force exerted by the protruding portion on a side closer to the reference surface 7 to the drop cable 19 is smaller than the pressing force exerted by the protruding portion on the front end side of the main body part 3 to the drop cable 19. Thus, it is possible to make the amount of displacement of the drop cable 19 small at a position closer to the reference surface 7 and to make the amount of displacement of the drop cable 19 large enough at the front end side of the main body part 3.

According to the second embodiment, the same effects as the first embodiment can be obtained. Also, by making the amount of protrusion of the pressing part 9b on the front end side larger than the amount of protrusion of the pressing part 9b on the side of the pressing part 9a, the amount of pressing toward the drop cable 19 can be gradually increased toward the front end. Thus, a sharp bend is not applied to the drop cable 19 in the proximity of a bordering part between the recessed portion 13 and the reference surface 7 and the amount of displacement of the drop cable 19 can be increased toward the front end. This can prevent the drop cable 19 from being applied with a local force and also can prevent the lid part 5 from lifting up due to reaction force of the drop cable 19.

The protruding portions forming the pressing part 9b are not limited to the example shown in the drawing and there may be three or more of the protruding portions. In this case, the heights of the protruding portions may change gradually toward the front end.

Also, instead of forming a plurality of the protruding portions, a slant may be provided for one protruding portion so as to change the height thereof. For example, in an optical-fiber-holding member 1b shown in FIG. 10, the pressing part 9b is not divided in the axial direction of the drop cable 19 but is formed as one body.

Figure 10:
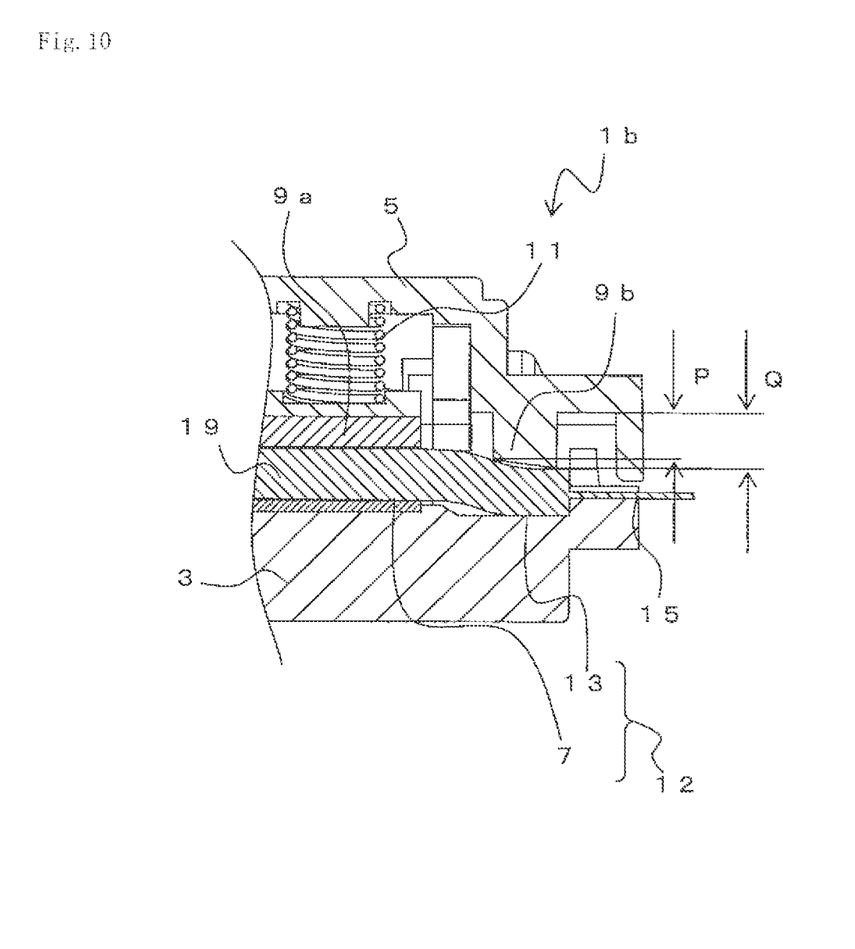
FIG. 10 is a drawing showing another embodiment of FIG. 9.

Also in this case, the amount of protrusion (Q in the drawing) from the inner surface of the lid part 5 of the pressing part 9b on the front end side of the main body part 3 (the right side in the drawing) is larger than the amount of protrusion (P in the drawing) from the inner surface of the lid part 5 of the pressing part 9b on the side of the pressing part 9a (the left side in the drawing). That is, the height of the pressing part 9b from the lid part 5 changes gradually.

In this way, the same effects as in the optical-fiber-holding member 1a can also be obtained. The tapered shape of the pressing part 9b may be in a straight line or in a curve.

Figure 11:
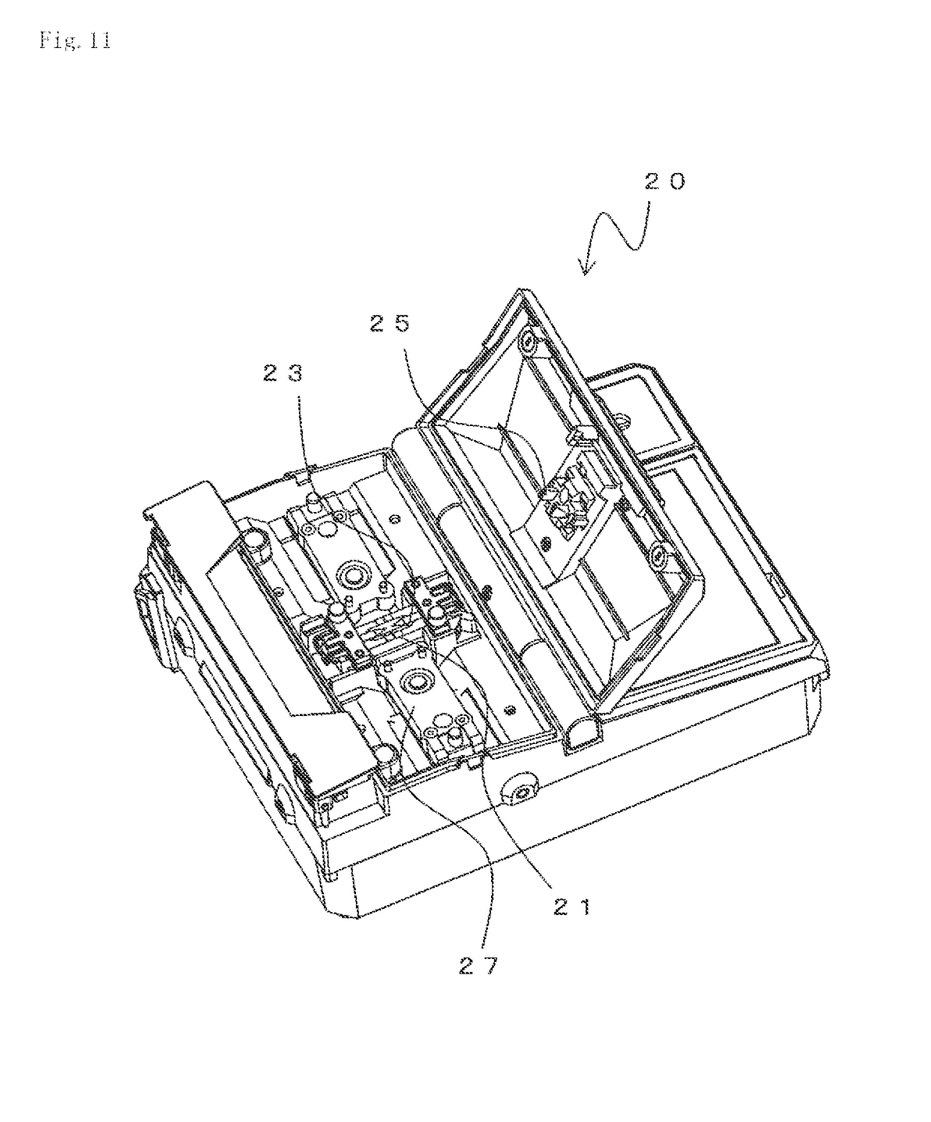
FIG. 11 is a perspective view showing a fusing device 20.
Figure 12:
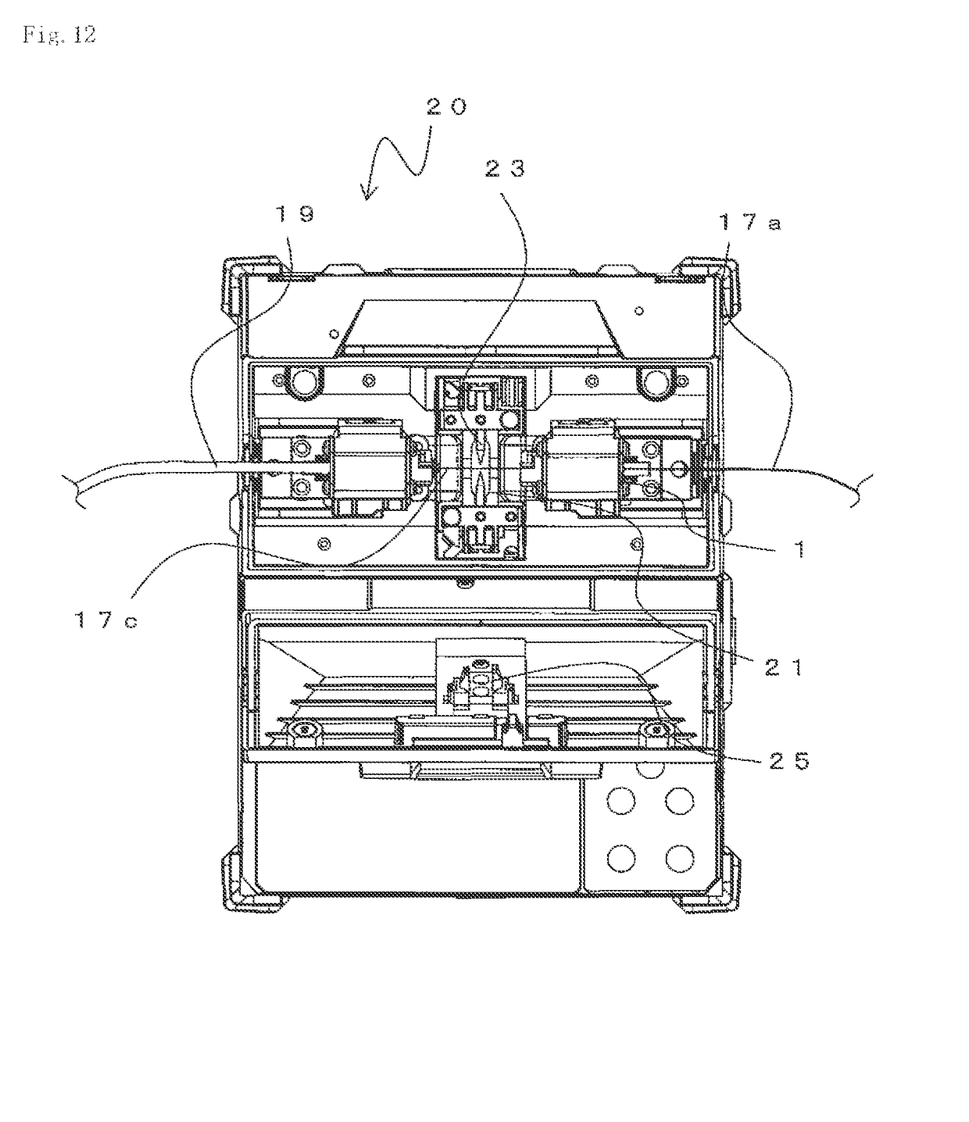
FIG. 12 is a plan view showing the fusing device 20.

Next, a fusing device using the optical-fiber-holding member will be described. FIG. 11 is a perspective view showing a fusing device 20 and FIG. 12 is a plan view showing a state in which the optical-fiber-holding member 1 is disposed in the fusion device 20. Although examples in which the optical-fiber-holding member 1 is used will be described in the descriptions hereinafter, the above-mentioned other optical-fiber-holding members 1a and 1b are also applicable. Also, FIG. 12 shows an example of fusion splicing of the drop cable 19 with the optical fiber core cable 17a.

The fusion device 20 includes holder-installation parts 27 on which the optical-fiber-holding members 1 are installed, a base member 21 on which tips of optical fibers and electrodes are disposed, electrode rods 23, and the like. The fusion device 20 is for splicing optical fiber core cable 17a and the drop cable 19 (the optical fiber core cable 17c) together by fusion, each of which are held by a pair of the optical-fiber-holding members 1 respectively. The pair of the optical-fiber-holding members 1 are installed on the holder-installation parts 27 that are on both sides of the base member 21.

The base member 21 holds a pair of the electrode rods 23 and tips of the optical fiber core cables 17a and 17c. A clamp 25 provided on a back face of a lid part presses the optical fiber core cables 17a and 17c on the base member 21 from above.

The pair of the optical-fiber-holding members 1 are disposed facing each other and the tips of the optical fiber core cables 17a and 17c are butted to each other. In this state, an arc is generated between the pair of the electrode rods 23 so that the tip parts of the optical fibers can be fused and spliced together.

In this way, the fusion device 20 using the optical-fiber-holding member 1 can fusion splice optical fibers together with certainty.

Although the embodiments have been described referring to the attached drawings, the technical scope of the claims is not limited to the embodiments described above. It is obvious that persons skilled in the art can conceive various examples of changes or modifications within the scope of the technical idea recited in the claims, and it will be understood that they naturally belong to the technical scope of the contemplated embodiments.

For example, other than the drop cable, the contemplated embodiments are applicable to an optical fiber cable having an optical fiber disposed at its center or an optical fiber cord by properly setting the amount of protrusion of the pressing part from the inner face of the lid part 5 and a depth of the recessed portion according to their own diameter.

What is claimed is:

1. An optical-fiber-holding member comprising:
   a main body part on which an optical fiber is disposed; and
   a lid part that can be opened and closed with respect to the main body part, wherein:
   an optical fiber installation part of the main body part comprises a reference surface holding the optical fiber and a recessed portion formed in proximity of a front end of the many body, and a bottom surface of the recessed portion is at a lower position than that of the reference surface;
   on an inner surface of the lid part, a first pressing part, of which an amount of protrusion from the inner surface of the lid part is variable, is provided at a position facing the reference surface, and a second pressing part, of which an amount of protrusion is fixed, is provided at a position facing the recessed portion;
   the amount of protrusion from the inner surface of the lid part of the second pressing part on a side of the front end of the main body is larger than the amount of protrusion from the inner surface of the lid part of the second pressing part on a side of the first pressing part; and
   both the protrusion of the second pressing part on the side of the front end of the main body and the protrusion of the second pressing part on the side of the first pressing part press the optical fiber.

2. The optical-fiber-holding member according to claim 1 wherein:
   with the lid part being closed, a distance in a height direction between a level of the reference surface and a lower end of the second pressing part is less than a maximum distance in the height direction between the level of the reference surface and a lower end of the first pressing part and is more than a minimum distance in the height direction between the level of the reference surface and the lower end of the first pressing part.

3. The optical-fiber-holding member according to claim 1 wherein:
   a holding part that holds the optical fiber is formed at the front end of the main body part and the holding part is approximately an U-shaped groove when viewed in an axial direction of the optical fiber.

4. The optical-fiber-holding member according to claim 3 wherein:
   the groove has a width of 0.9 mm or more.

5. A fusion device comprising:
   the optical-fiber-holding member according to claim 1; and
   a pair of electrode rods that are provided between a pair of the optical-fiber-holding members, wherein
   an arc is generated between the pair of the electrode rods so that the optical fibers held by the optical-fiber-holding members can be fused together.

* * * * *